United States Patent [19]

Griebel et al.

[11] Patent Number: 4,728,029
[45] Date of Patent: Mar. 1, 1988

[54] FLAMELESS HEATER FOR OPERATOR'S CAB

[75] Inventors: Francis J. Griebel, Lexington; Douglas W. Endres, Nicholasville, both of Ky.

[73] Assignee: FMC Corporation, Chicago, Ill.

[21] Appl. No.: 873,930

[22] Filed: Jun. 13, 1986

[51] Int. Cl.[4] .............................................. B60H 1/02
[52] U.S. Cl. .................... 237/12.3 R; 122/26; 126/247
[58] Field of Search ................. 237/12.3 R; 126/247; 122/26

[56] References Cited

U.S. PATENT DOCUMENTS

| | | | |
|---|---|---|---|
| 4,192,456 | 3/1980 | Shields et al. | 237/12.3 |
| 4,346,839 | 8/1982 | Moser | 237/12.3 R |
| 4,407,449 | 10/1983 | Moser et al. | 122/26 |
| 4,432,493 | 2/1984 | Moser et al. | 237/12.3 R |

Primary Examiner—Henry A. Bennet
Attorney, Agent, or Firm—Ronald C. Kamp; Lloyd B. Guernsey; Richard B. Megley

[57] ABSTRACT

A flameless heater for operator's cab having automatic heat control. A hydraulic pump provides pressurized fluid which flows through a fluid restrictive orifice to produce thermal energy and raise fluid temperature as a result of a drop in hydraulic pressure. The heated fluid flows through a heat exchanger where a fan blows air over the exchanger to provide hot air for the operator's cab. A spool valve connected in parallel with the orifice bypasses fluid around the orifice to limit the rise in fluid temperature. A temperature sensor selectively opens and closes the spool valve to keep fluid temperature within a high temperature limit and a low temperature limit.

3 Claims, 3 Drawing Figures

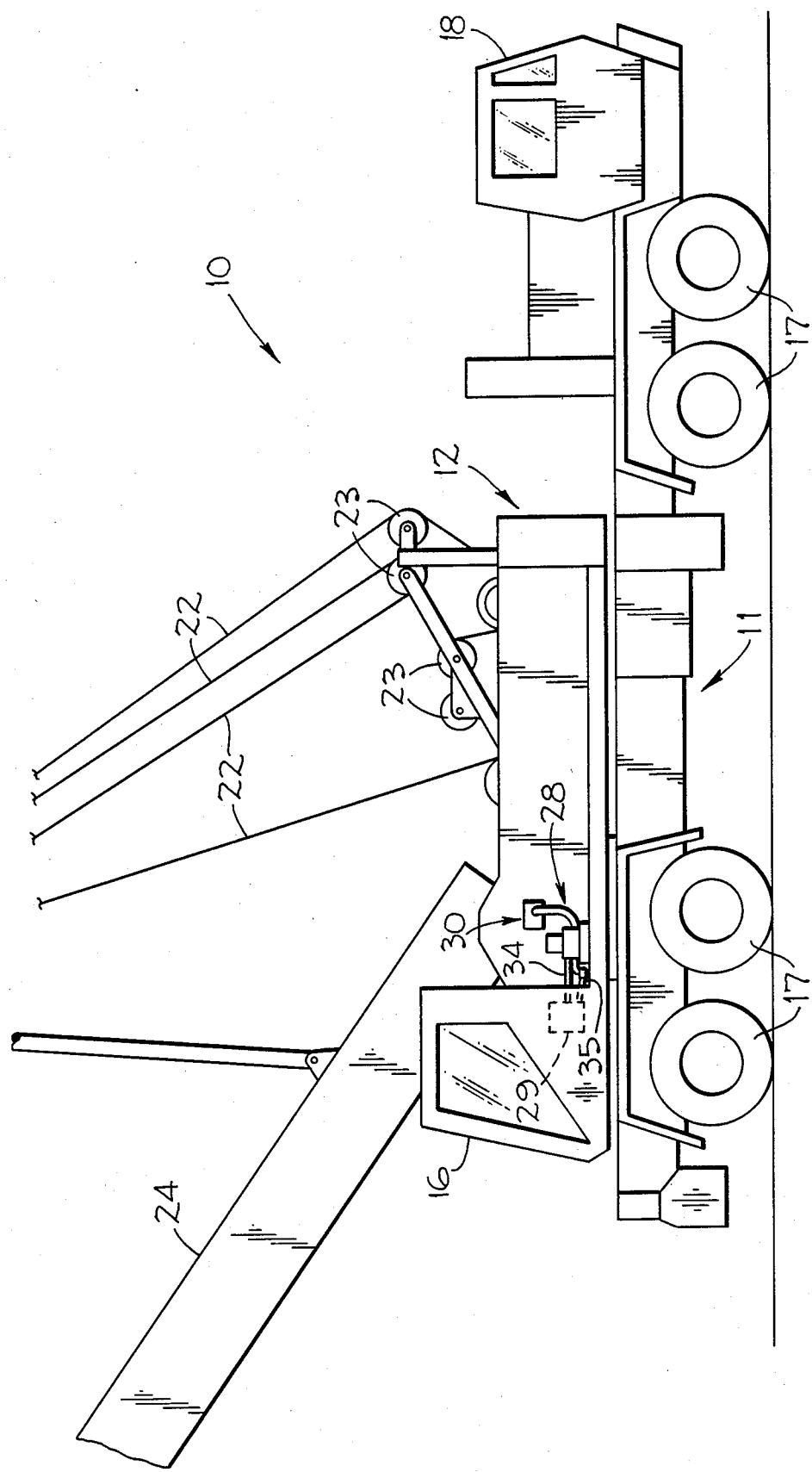
FIG_1

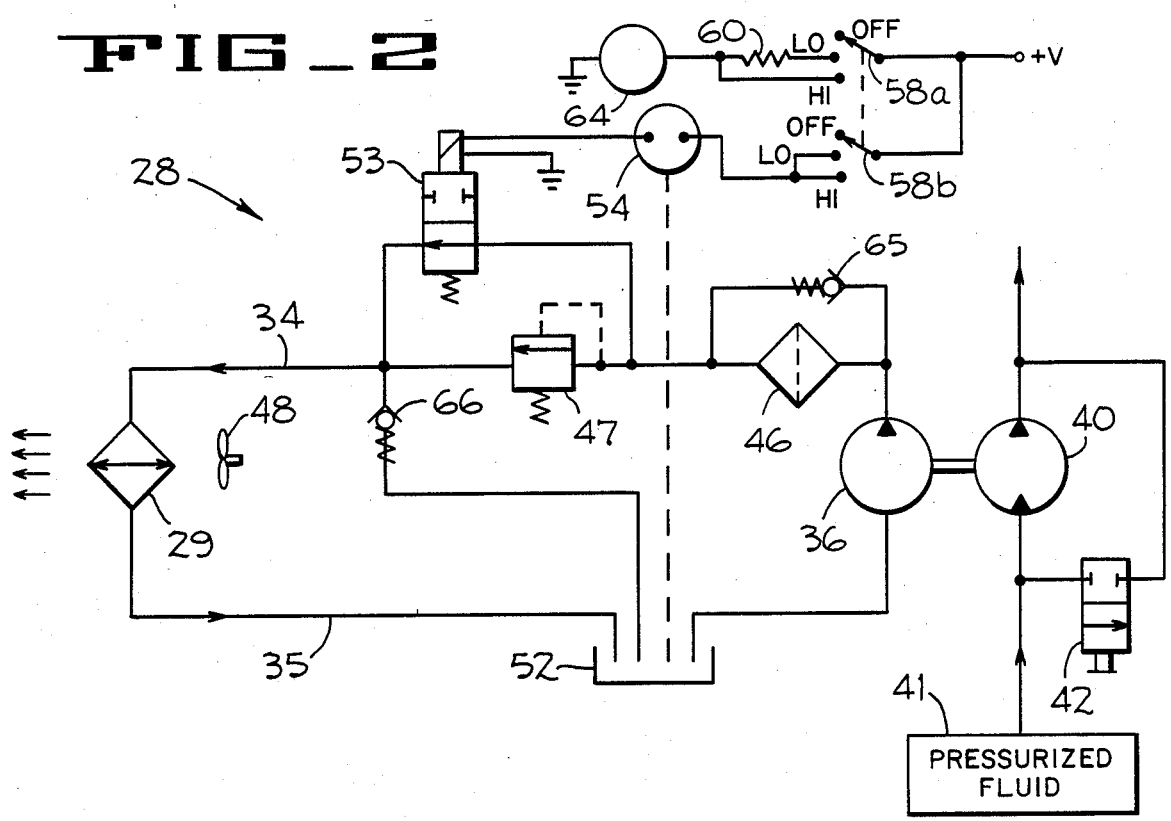
FIG_2
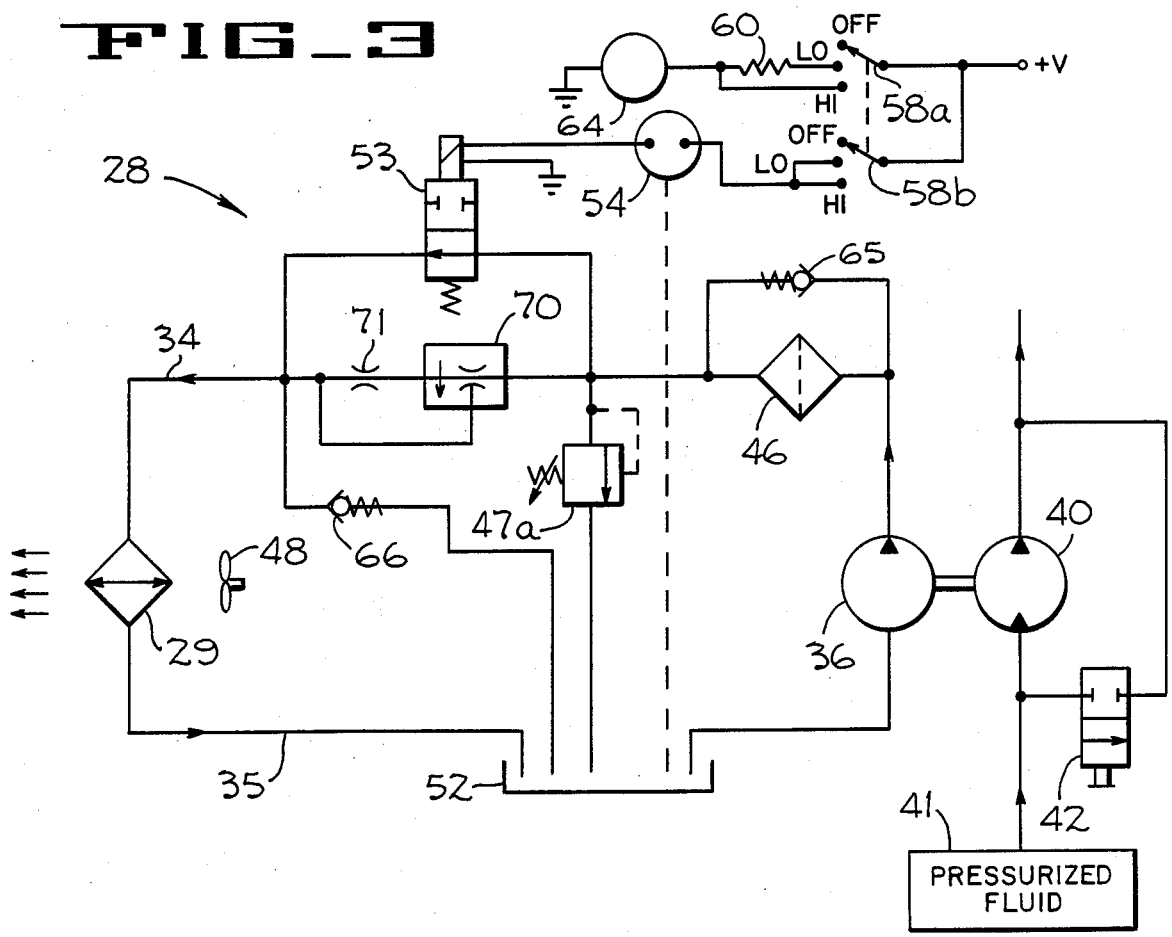
FIG_3

FLAMELESS HEATER FOR OPERATOR'S CAB

BACKGROUND OF THE INVENTION

This invention relates to heating systems and more particularly, to a flameless heating system for the operator's cab of material handling machines.

The operator's cab of trucks, construction equipment, mobile cranes, overhead cranes, tractors and other vehicles require heating systems for use in colder climates. In some areas, such as paint plants, chemical plants and other environments it may not be desirable to use hot wires or open flames to produce heat for the operator's cab. The circulation of fluid from vehicle engines to provide heat for the operator's cab may require complex equipment, may be expensive, and inconvenient to service and maintain.

SUMMARY OF THE INVENTION

The present invention provides a flameless cab heating system which is relatively simple and employs readily available commercial components. The heating system includes a hydraulic pump driven by the vehicle engine, a source of hydraulic fluid connected to the hydraulic pump, a heat exchanger such as a fin-and-tubes type of heat exchanger and a fluid restrictive orifice connected between the pump and the heat exchanger. Pressurized fluid through the orifice produces thermal energy and raises the temperature of the fluid as a result of a drop in hydraulic pressure as the fluid flows through the orifice. A fan directs air across the heat exchanger to transfer heat from the exchanger to the air. A spool valve connected in parallel with the fluid restrictive orifice regulates fluid temperature by bypassing fluid around the orifice when the temperature increases to a first predetermined value. The spool valve is closed to prevent fluid bypass when the fluid temperature drops below a second predetermined value.

BRIEF DESCRIPTION OF THE DRAWINGS

FIG. 1 is a side elevation of a mobile vehicle showing a flameless heater of the present invention mounted in the vehicle.

FIG. 2 is a schematic diagram of a first embodiment of a flameless heater of the present invention.

FIG. 3 is a schematic diagram of another embodiment of a flameless heater of the present invention.

DESCRIPTION OF THE PREFERRED EMBODIMENT

FIG. 1 of the drawings illustrates a mobile vehicle, such as a crane 10 having a carrier 11 supporting an upper structure 12. The mobile vehicle includes an operator's cab 16 and a plurality of support wheels 17 for moving and guiding the vehicle 10 along streets and roads. A driver's cab 18 is used when the vehicle is being moved onto a working site. A plurality of wire ropes 22 and sheaves 23 are used to control the attitude of a boom 24 when the vehicle is in use. A flameless heating system 28 of the present invention is mounted with a heat exchanger 29 inside the cab 16 and with another hydraulic portion 30 of the heating system 28 mounted on the upper structure 12. A pair of hydraulic lines 34, 35 interconnect the heat exchanger 29 and the other portions 30.

The heating system 28 (FIG. 2) includes a hydraulic heat pump 36 driven by a hydraulic motor 40 which is powered by a source of pressurized fluid 41. The pressurized fluid from source 41 can be used to operate a variety of other devices (not shown) on the mobile vehicle of FIG. 1. A spool valve 42 is used to bypass fluid around motor 40 during warm weather when the heating system 28 is not used. The heater pump 36 provides pressurized fluid through a filter 46 to a pressure relief valve 47 and to heat exchanger 29. The pressure relief valve 47 includes an orifice (not shown) which produces thermal energy and raises the temperature of the hydraulic fluid as a result of a drop in pressure as fluid moves through the orifice. The heated fluid passes through hydraulic line 34 and through heat exchanger 29 where a fan 48 moves air over the heat exchanger 29 to transfer heat from the heat exchanger 29 to the air. Hydraulic line 35 returns the hydraulic fluid to a sump tank 52.

A spool valve 53 (FIG. 2) and a temperature sensitive switch 54 selectively bypass fluid around relief valve 47 to regulate temperature of fluid flowing into heat exchanger 29. When a heater switch 58b is closed and the fluid temperature in tank 52 is less than 170° F. the switch 54 is closed thereby energizing spool valve 53 causing the fluid path through spool valve 53 to be open so all of the fluid flows through relief valve 47 causing the hydraulic fluid to heat. When fluid in tank 52 exceeds 170° F. switch 54 is open so fluid flows through spool valve 53 bypassing relief valve 47 and causing fluid temperature to decrease as heat is tranferred from heat exchanger 29 to the air flowing over the exchanger 29. When fluid temperature drops to 150° F. switch 54 again closes and all of the fluid flows through relief valve 47. If a supply voltage +V should fail, the spool valve 53 provides a bypass around relief valve 47 and prevents overheating of hydraulic fluid.

A fan switch 58a (FIG. 2) couples electrical power to a resistor 60 and a fan motor 64 when switch 58a is in the "lo" position. In the "hi" position of switch 58a fan speed is increased to increase the amount of heat provided by air flow over the heat exchanger 29. A check valve 65 provides a bypass around filter 46 and a check valve 66 provides a bypass around heater exchanger 29 to prevent excessive pressures from developing across filter 46 and heat exchanger 29.

Another embodiment of the present invention disclosed in FIG. 3 uses a variable restrictor 70 and a fixed restrictor 71 to produce thermal energy and raise temperature of the hydraulic fluid. A pressure relief valve 47a bypasses excessive fluid to the sump tank 52. Spool valve 53 and temperature sensitive switch 54 selectively pass fluid around the restrictors 70, 71 to regulate temperature of fluid flowing into heat exchanger 29. When heater switch 58b is closed and the fluid temperature in tank 52 is less than 170° F. the switch 54 is closed causing the fluid path through spool valve 53 to be open so all of the fluid flows through restrictors 70, 71 causing the hydraulic fluid to heat. When fluid in tank 52 exceeds 170° F. switch 54 is open so fluid flows through spool valve 53 bypassing restrictors 70, 71 and causing fluid temperature to decrease as heat is transferred from heat exchanger 29 to the air flowing over the exchanger 29. When fluid temperature drops to 150° F. switch 54a again opens and all of the fluid flows through restrictors 70, 71.

Thus, the present invention provides flameless heat for an operator's cab and automatically regulates the temperature of fluid flowing into the heat exchanger.

Although the best mode contemplated for carrying out the present invention has been herein shown and described, it will be apparent that modification and variation may be made without departing from what is regarded to be the subject matter of the invention.

What is claimed is:

1. A flameless heating system for the opertor's cab of a machine having at least one hydraulically-actuated device powered by a source of pressurized hydraulic fluid connected with said device by a supply line; said system comprising:
   a hydraulic reservoir mounted on said machine;
   a hydraulic motor interposed in and in constant communication with said supply line;
   a hydraulic pump mechanically connected to and driven by said motor and having an intake conduit connecting said pump to said reservoir;
   a heat exchanger mounted adjacent said cab; an output conduit connecting said pump and said heat exchanger;
   a flow restrictor interposed in said output conduit to increase the temperature of hydraulic fluid flowing therethrough;
   on-off valve means selectively movable between a heat position in which fluid from said source is forced to flow through said motor causing said pump to circulate hydraulic fluid through said heat exchanger and a no-heat position in which fluid from said source bypasses said motor and said pump is not driven;
   bypass valve means connected in parallel with said flow restrictor and responsive to the temperature of the hydraulic fluid in said reservoir reaching a predetermined high temperature for directing the output from said pump to said heat exchanger, whereby the work done by said pump, except for piping losses, is limited to circulation of said hydraulic fluid through said heat exchanger whenever the temperature of the hydraulic fluid in said reservoir is at or above said high temperature.

2. The invention according to claim 1, wherein said flow restrictor is a pressure relief vlave.

3. The invention according to claim 1, wherein said flow restrictor comprises:
   a fixed restrictor and a variable restrictor arranged in series with the fixed restrictor being downstream of said variable restrictor and the variable restrictor varying its resistance to flow in response to the pressure downstream of said fixed resistor.

* * * * *